(No Model.)
A. M. YOUNG.
ELECTRIC BATTERY.
No. 311,630. Patented Feb. 3, 1885.
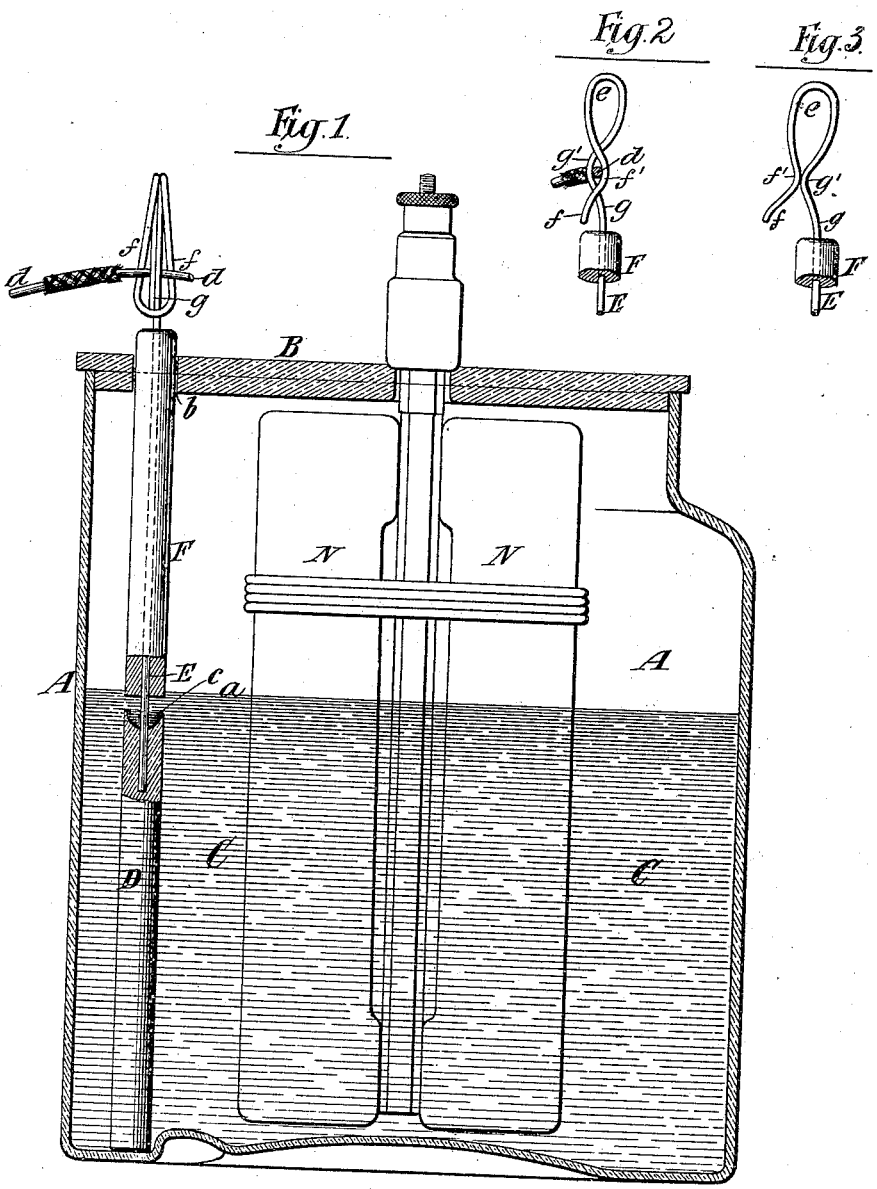
Witnesses:-
C. E. Sundgren
Jno. Hayner
Inventor:-
Alden M. Young.
by his Atty.
Brown & Hall

UNITED STATES PATENT OFFICE.

ALDEN M. YOUNG, OF WATERBURY, CONNECTICUT, ASSIGNOR OF ONE-FOURTH TO DAVID S. PLUME, OF SAME PLACE.

ELECTRIC BATTERY.

SPECIFICATION forming part of Letters Patent No. 311,630, dated February 3, 1885.

Application filed March 11, 1884. (No model.)

*To all whom it may concern:*

Be it known that I, ALDEN M. YOUNG, of Waterbury, in the county of New Haven and State of Connecticut, have invented a new and useful Improvement in Electric Batteries, of which the following is a specification.

My invention is applicable more particularly to batteries of the "Leclanché" type, in which a zinc electrode is immersed in a sal-ammoniac solution.

The invention consists in the combination, with a battery-jar and its cover and a negative electrode, of a zinc electrode consisting of a rod adapted to be entirely immersed in the battery-liquid, and having a cavity for quicksilver in its upper end and an insulated conductor fixed in the zinc electrode and extending upward therefrom through the cover.

The invention also consists in a novel combination of parts, hereinafter described, and pointed out in the claims.

In the accompanying drawings, Figure 1 represents a sectional elevation of a battery embodying my invention. Fig. 2 is a view of the clamp and a line-wire attached; and Fig. 3 represents the clamp before the line-wire is attached.

Similar letters of reference designate corresponding parts in all the figures.

A designates the battery jar, which may be of glass or other vitreous or suitable material, and B designates the cover thereof, which may be of hard rubber or other suitable material. In the jar is the usual battery-charge, C, which in the Leclanché battery is sal-ammoniac and water, and *a* designates the level of the liquid charge.

N designates the negative electrode, which may be carbon or other material, or a combination of materials.

D designates the zinc electrode, which, as shown, consists of a zinc rod, and from which a wire or conductor, E, extends upward through a hole, *b*, in the cover or lid B of the jar. The wire E may be permanently connected with or fixed in the electrode D in any suitable manner. The end of the electrode may be drilled for the reception of the wire, and the wire then inserted downward thereinto and soldered therein, as shown in Fig. 1. The electrode D is of such length that when resting on the bottom of the jar A its upper end will be slightly below the level *a* of the liquid C, and hence there will be no rapid corrosion of the electrode at any one point.

The wire E above the electrode D is surrounded by a sheath, F, of wood or any other non-corrosive material, which extends upward through the hole *b*, around the wire, and which preferably also extends downward just below the liquid-level *a*. The wire E may be of brass or other metal, and the sheath F, which surrounds it, keeps it in place and steadies it, thereby preventing it from bending to such an extent as to allow the zinc D to touch the other electrode. The sheath is removably slipped on the wire E above the electrode D.

In the upper end of the zinc electrode D is formed a pocket or cavity, *c*, for the reception of a small quantity of quicksilver, to preserve the amalgamation of the zinc.

The wire E extends considerably above the top of the sheath F, and from it is formed a spring-clamp for the attachment of the conductor or line-wire *d*. To form the clamp here shown, the wire E is first doubled or turned back upon itself, and the double portion is again turned or bent back, so as to form a spring-bow, *e*, the downwardly-extending portions *f f* of which are separated sufficiently to enable them to receive the portions *g g* between them. In the portions *f f* is a bend, *f'*, and in the portions *g g* is a reverse bend, *g'*. The elasticity of the spring-bow *e* causes the portions *f f* to spring outward, as shown in Fig. 3; but when the said portions *f f* are pressed inward sufficiently the bend *f'* passes the bend *g'*, and together they form an eye or socket for the reception of the line-wire *d*, and in which the said line-wire is firmly held by the tendency of the portions *f f* to spring outward.

I do not here claim the clamp shown and described, but intend to make it the subject of another application for Letters Patent.

I am aware that it is not new to employ in a battery a cup or holder of india rubber, which is immersed in the battery-liquid, and from which an insulated conductor extends upward through the cover. In such a battery the cup or holder contains quicksilver, which makes contact with the metallic conductor, and in which floats the zinc electrodes, consisting of a ring or disk loosely surrounding the insulated conductor. I am also aware that it is not new to employ in a chloride-of-silver battery a silver-chloride plate which is immersed in the battery-liquid, and from which a silver wire extends upward through the cover, the wire being strengthened or stiffened and protected by a glass tube securely cemented thereon. I do not claim the above-described constructions as included in my invention.

What I claim as my invention, and desire to secure by Letters Patent, is—

1. The combination, with the battery-jar and its cover and a negative electrode, of a zinc electrode consisting of a rod, D, adapted to be entirely immersed in the battery-liquid and having a cavity, c, for quicksilver in its upper end, and an insulated conductor, E, fixed in the upper end of the zinc electrode and extending upward therefrom through the cover, substantially as herein described.

2. The combination, with the jar A and the negative electrode, of the zinc rod D, forming the positive electrode and immersed in the battery-liquid, the conductor E, fixed in said rod, and the sheath F, of wood or other non-corrosive material, removably slipped upon the conductor above the electrode, substantially as herein described.

ALDEN M. YOUNG.

Witnesses:
C. HALL,
FREDK. HAYNES.